April 25, 1933.  E. D. EBY  1,905,691
JOINT FOR HIGH TENSION UNDERGROUND CABLES
Filed Feb. 9, 1927
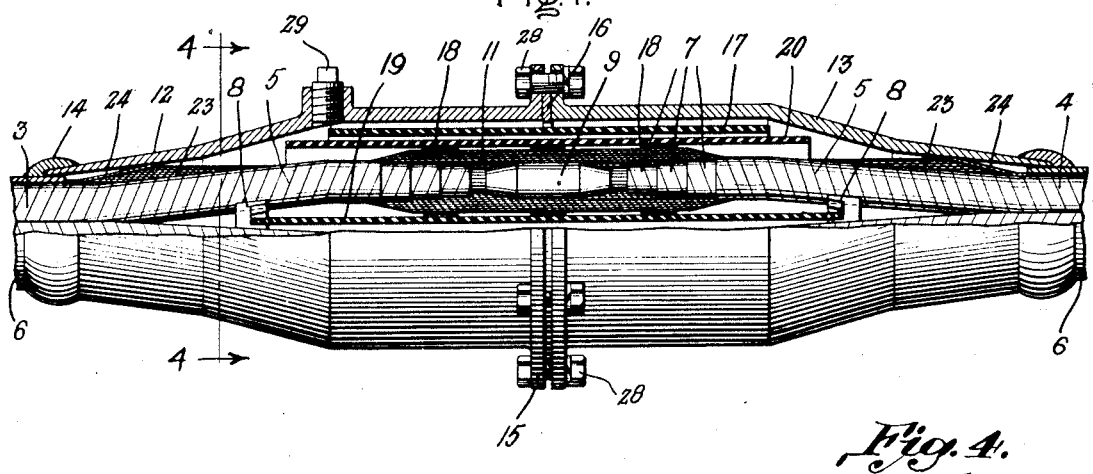
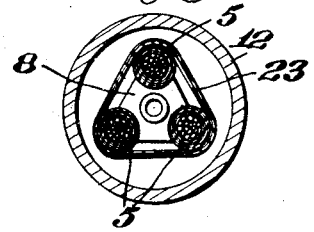
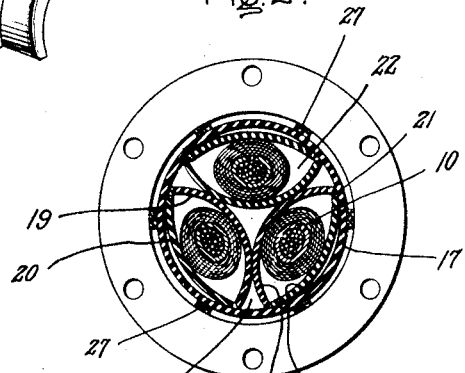
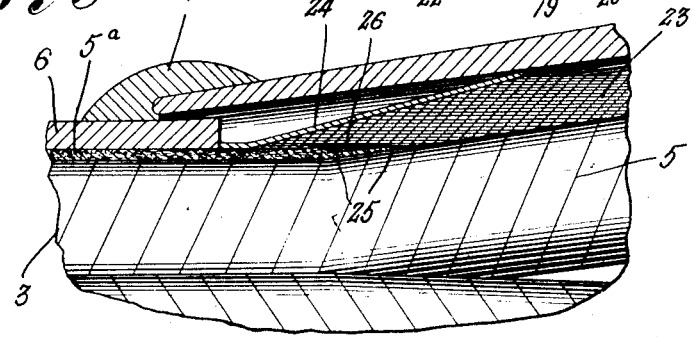
Inventor:
Eugene D. Eby,
by *[signature]*
His Attorney.

Patented Apr. 25, 1933

1,905,691

UNITED STATES PATENT OFFICE

EUGENE D. EBY, OF PITTSFIELD, MASSACHUSETTS, ASSIGNOR TO GENERAL ELECTRIC COMPANY, A CORPORATION OF NEW YORK

JOINT FOR HIGH TENSION UNDERGROUND CABLES

Application filed February 9, 1927. Serial No. 167,032.

The present invention relates to joints for multiple conductor cables, and more specifically to three conductor cables of the type in which each conductor is separately insulated by factory wound paper insulation, the said conductors being subsequently covered collectively by belt or overall insulation which in turn is enclosed in a lead sheath.

One object of my invention is to improve the construction of such joints and specifically to reduce to a minimum the amount of labor and tape commonly used in making them through the introduction of suitably formed sheet insulation barriers of novel construction whereby the electrical stresses are distributed as uniformly as possible, and a further object is to reduce the total length of the joint which is rendered possible by reason of the improved barriers.

For a consideration of what I believe to be novel and my invention, attention is directed to the accompanying description and the claims appended thereto.

In the attached drawing which is illustrative of my invention, Fig. 1 is a view partly in section and partly in elevation of a cable joint; Fig. 2 is a central cross-section thereof, Fig. 3 is a detail view showing the construction near the sheath. Fig. 4 is a cross-section on line 4—4 of Fig. 1, and Fig. 5 is a perspective view of a spacer for the conductors.

As shown, the cable sections 3 and 4 each have three conductors spaced 120° apart. They may be round or sector shaped, as desired. Each conductor is wound with paper tape 5 or equivalent factory wound insulation, and they may be bound together by belt insulation 5a or not as desired. The spaces between the conductors and inside of the belt insulation may be filled with fillers of any suitable or usual construction. In preparing the cable sections for jointing, the belt insulation 5a and lead sheath 6 are cut back from the ends of the conductors for a suitable distance, the insulation on the conductors being cut back by a series of shallow steps 7. Having prepared all six ends of the conductors they are first spaced apart outwardly and suitable spacers 8 are inserted in the crotches, one at each end, each of said spacers having three peripheral notches or recesses of suitable shape to conform to the shape and size of the insulation on the conductors. These spacers are held in spaced relation by reason of their frictional engagement with the conductors and with the ends of the barriers which will be referred to later. The exposed ends of the respective conductors of both cable sections are then scraped clean and united to those opposed thereto by sleeve connectors 9 which are soldered thereto. Preferably each connector has a means for admitting solder to the interior, as for example by the slot 10. Around each of the sleeves and the stepped insulation is wrapped suitable insulation 11, such for example as a tapered sheet of insulating material or cambric tape which has been previously treated with a suitable compound. It is advisable to wind the stepped portion at the inner corners of the steps with candle wicking or cotton yarn before winding on the tape.

Prior to spreading the ends of the conductors the casing or shell for the joint which is in two parts 12 and 13 is loosely threaded over the respective cable sections and moved along the sheath a sufficient distance to expose the cable ends and permit the necessary work to be performed. The shell or casing by preference is made of cast metal with the outer end of each part 12 or 13 somewhat reduced in thickness and designed to be connected to the sheath by a wiped soldered joint 14, and each part is provided at the other or inner end with an out-turned flange 15. Between the faces of the flanges is located a compressible gasket 16 which is impervious to moisture as well as to the compound employed to fill the casing after the jointing operation is completed.

Either before or after the conductors are spread and the spacing blocks 8 inserted and before the conductors are joined or spliced a tubular casing-liner or element 17 of insulating sheet material is slipped over the ends of the conductors of one section and positioned beyond the region of the joints to permit of the work thereon.

After the conductor ends are united by the connectors 9 and properly taped several annular spacers 18 are mounted on each of said taped portions. These may be made of separately formed insulating material or they may be in the form of wound on tape. Between the several joints are then inserted preformed segmental barriers 19 which are made of suitable insulating material. For convenience, these will be referred to as the inner barriers, and as shown in Fig. 2, each barrier engages the spacers 18 on one taped portion of a joint at the center and engages the two other inner barriers at a region nearer the side edges. The side edges abut the tube or liner 17 after it is moved to its final position. The three inner barriers, as shown in section in Fig. 1, are long enough to engage both of the spacing blocks 8 and to hold them in proper spaced relation and in frictional contact with the bent portions of the several conductors. Resting on the said annular spacers 18 of each taped joint are preformed segmental barriers 20 which for convenience will be termed outer barriers. These barriers rest on the spacers 18 at the center, and at their outer ends engage the tube 17 and abut the ends of the inner barriers as shown at 21 in Fig. 2. Due to this arrangement a series of longitudinal channels 22 are formed which are later filled with insulating fluid. These barriers are preferably shaped or preformed and cut to size before being inserted in the joint so as to facilitate the making of the joint. As will be noted, both the inside and outside barriers are parts of cylinders. This is particularly advantageous in manufacture since they may be cut from cylinders which, of course, differ in diameter for the different segments, one set having a greater radius of curvature than the other. All of these segmental barriers are mutually wedged into their final positions and held by the outer tube or liner 17. Having mounted all the barriers in place, the outer ones may be temporarily held in place by any suitable means, as by a cord binder, for example, after which the tube 17 is moved longitudinally to its final position which is that shown in Fig. 1. After one end of the tube is moved over the adjacent ends of the outer barriers they will be thereby held in place and the temporary binder can be removed. Prior to mounting the casing in its final position and after the various barriers have been properly placed in position, the three conductors of each cable section are hand wound or bound down with cambric or equivalent tape as indicated at 23. Outside of this tape is a thin copper or other metallic band 24 which is in electrical contact with the sheath and provides a smooth transition from the interior surface of the cable sheath to the gradually expanding conical surfaces of the casing so as to properly distribute the stresses due to the high voltage. When the conductors are bound with a metallic ribbon to give additional strength to the cable it is desirable to solder the band 24 to it. Preferably, the belt insulation 5a which is under this tape wrapping is stepped at 25 Fig. 3 in the same manner as described in connection with the conductor insulation. This stepping of the belt insulation increases its end flexibility and thereby facilitates the separation of the several conductors. A further and more important feature is that these steps in the belt insulation reduce the length of cut surface over which a radial stress may act. Before wrapping the tape around the belt insulation the steps at the corners are wound with yarn 26 which fills any voids which might otherwise exist beneath the wrapped tape 23.

In order to center the outer tube 17 within the outer shell or casing when the parts of the latter are in place, one half of the casing is moved into its final position after which small longitudinally extending spacers 27 are inserted in place and suitably spaced as best shown in Fig. 2. After this is done the other half of the casing is moved into position and the two parts with the gasket 16 between united by the bolts 28. The ends of the casing are then soldered to the sheaths of the two cable sections.

In order to fill the casing with an insulating fluid after the parts are assembled a filling opening is provided which may either be permanently closed by a screw plug 29 or the chamber in the casing may be connected through said opening to a suitably sealed reservoir or other source of fluid under pressure. For the insulating fluid I prefer to use a superior grade of linseed oil as its dielectric constant is practically the same as that of the paper insulation on the conductors. The use of said oil greatly strengthens the insulation at the cable crotch at each end of the joint, and on account of its high dielectric constant it successfully resists the stress between the conductors. The low viscosity of the linseed oil prevents the formation of small cracks or voids which are a common source of trouble with less fluid fillers.

The length of the joint is reduced to a minimum by distributing the voltage gradient along the surface of the conductor insulation as uniformly as possible. This is accomplished chiefly by giving to the conductors a predetermined shape as shown in Fig. 1 by means of a template and holding the conductors in position by the spacer blocks 8 and then separating them by the barriers.

What I claim as new and desire to secure by Letters Patent of the United States, is:

1. A joint for sheathed cable conductors comprising a casing which unites the sheaths, a cylindrical lining for the casing, connectors for the conductors which are located within the lining between its ends, inner segmental barriers which are situated between the conductors, the sides of which engage the inner surface of the lining, and outer segmental barriers the sides of which also engage the inner surface of the lining, the edges of the inner and outer barriers of each conductor terminating at their points of contact.

2. A joint for sheathed cable conductors comprising a casing which with the sheaths forms an envelope for the conductors, a lining for the casing, connectors for the conductors, an insulated covering for each connector, inner segmental barriers which are located between the several conductors each of which is supported in its central region by said insulated covering, on opposite sides of the conductor by two adjacent barriers and at its side edges by the inner wall of the lining.

3. A joint for sheathed cable conductors comprising a casing which with the sheaths forms an envelope for the conductors, an insulated covering for each conductor, inner segmental barriers each of which is supported by the inner portion of the insulated covering, by two adjacent barriers and the inner wall of the lining, and outer segmental barriers each of which is supported by the outer portion of one of the insulated coverings and the inner wall of the lining and contacts with the side terminal edges of an inner barrier.

4. A joint for sheathed multiple conductor cables comprising a casing which with the sheaths forms an envelope for the conductors, connectors for the conductors, spacing blocks which spread the conductors at opposite ends of the connectors and enlarge the spacing thereof and also hold them in proper spaced relation, said blocks being seated between the diverging portions of the conductors, inner barriers for holding the blocks in their respective positions, and outer barriers which separate the connectors and conductors from the inner wall of the casing.

5. A joint for sheathed multiple conductor cables comprising a casing which with the sheaths forms an envelope for the conductors, connectors for the conductors, spacing blocks which spread the conductors at opposite ends of the connectors and also hold them in proper spaced relation, inner barriers in the form of segments of cylinders which extend between the conductors, the ends of which hold the blocks in spaced relation, outer barriers in the form of segments of cylinders which cover the outer portions of the conductors, and a tubular lining which surround both the inner and outer barriers the edges of said barriers engaging the inner wall of the lining and held thereby.

6. A joint for sheathed cable conductors, comprising a casing which unites the sheaths, stepped belt insulation for the conductors near the ends of the casing, means for spreading the conductors near said belts, windings of insulating material over the stepped portions of the belt insulation, metallic means which overlie said windings and make contact with the sheaths and casing to distribute electrical stresses in the regions thereof, connectors for the conductors, and bodies of insulation which separate the connectors and conductors from one another and from the casing.

7. A joint for a sheathed multiple conductor cable comprising a casing which with the sheaths forms an envelope for the conductors, an insulated covering for each conductor, belt insulations which surround said coverings, the ends of said belts adjacent the casing being cut away by steps to increase their flexibility, blocks located near the ends of the belts which space the conductors, connectors for the conductors, wrapped-on bodies of insulation for each connector and the adjacent ends of the conductors, inner barriers located between the spaced conductors, outer barriers which cover the outer surfaces of the spaced conductors, and a lining which encloses the barriers and is located within the casing.

8. A joint for sheathed multiple conductor cables comprising a casing which with the sheaths forms an envelope for the conductors, an insulated covering for each conductor, said insulation being reduced in amount adjacent the connectors, means for spacing the conductors apart in the region of the connectors, connectors for uniting corresponding aligned conductors, a wrapped-on body of insulation for each connector and the ends of the conductors united thereby, said body being tapered at its opposite ends, a body of tape which is wrapped around all of the conductor coverings in the region where the conductors emerge from the sheaths, each of said bodies being tapered at both ends, a metallic band which covers the tapered portion of each of said bodies adjacent a sheath and is in electrical contact with the sheath to distribute the stresses, due to high voltages, and barriers which further insulate the conductors from each other and from the casing.

9. A joint for sheathed multiconductor cables comprising an outer casing joined to the cable sheaths, a lining of sheet insulation for said casing, connectors joining the respective conductors, a tape wrapping for each connector and also the adjacent insulated ends of the conductors, segmental barriers of sheet insulation extending between the tape wrapping on each conductor and those on the other two conductors, said barriers abuttitng at the side edges thereof against the inner surface of the lining of said casing whereby they are held in their respective fixed positions, spacing blocks located in the crotches, a wrapping of insulation at each crotch for binding the conductors, and metallic bands surrounding the wrappings, said bands being in electrical contact with the sheaths and the joint casing.

10. A joint for sheathed multiconductor cables comprising an outer casing joined to the cable sheaths, a lining of sheet insulation for said casing, means for spacing said lining concentrically from said casing, connectors joining the respective conductors, wrapped on bodies of insulation about the respective connectors and the conductor ends connected thereby, segmental barriers of sheet insulation extending between each conductor and the other two conductors and abutting at the side edges thereof against the inner surface of the lining of said casing, and means for spacing said wrapped on bodies of insulation from said segmental barriers respectively.

11. In combination, a pair of insulated conductors from which insulation is removed in the region of their adjacent ends, metallic sheaths which enclose the insulation on said conductors and are cut back from the respective conductor ends, a connector which electrically unites the bared ends of the conductors, a body of tape which is wrapped over the connector and also over the insulation on the ends of the conductors adjacent thereto, a metallic enclosing casing which is united at its ends to the sheaths and contains fluid insulation, a preformed lining of sheet insulation located between the body of tape and the inner wall of the casing, a tape wrapping which surrounds the insulated conductors adjacent the cut end of their sheaths, the body so formed increasing in diameter toward the connector, and a peripheral metal band which covers one end of each of said bodies of tape wrappings and establishes electrical contact with the sheath at one end and the inner wall of the casing at the other end.

In witness whereof, I have hereto set my hand this fifth day of February, 1927.

EUGENE D. EBY.